Oct. 12, 1965  SHOZO MIYAKAWA ETAL  3,211,441
METHOD OF AND APPARATUS FOR AUTOMATICALLY
CONTROLLING SINTERING MACHINE
Filed Oct. 10, 1963  5 Sheets-Sheet 1
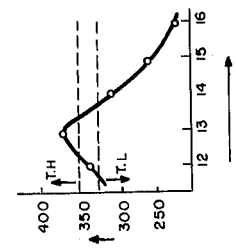
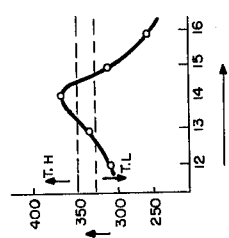
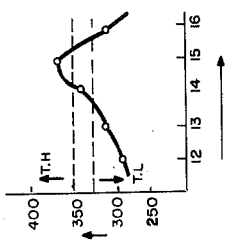
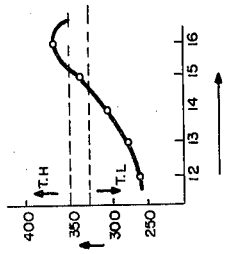
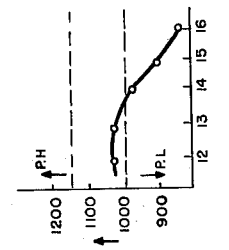
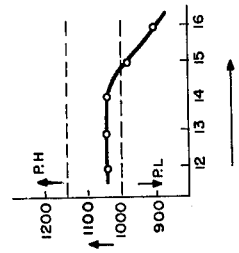
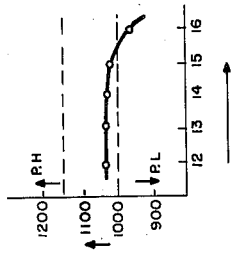
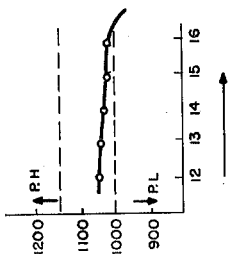
S. Miyakawa,
T. Hasegawa and
Y. Sawada
INVENTORS
BY Wenderoth, Lind & Ponack
ATTORNEYS INVENTORS
Shozo Miyakawa
Tadahisa Hasegawa
Yasuhiro Sawada
By Wenderoth, Lind & Ponack Attys.

United States Patent Office 3,211,441
Patented Oct. 12, 1965

3,211,441
METHOD OF AND APPARATUS FOR AUTOMATI-
CALLY CONTROLLING SINTERING MACHINE
Shozo Miyakawa and Tadahisa Hasegawa, Kitakyushu,
Fukuoka, Prefecture, and Yasuhiro Sawada, Kawasaki,
Kanagawa, Japan, assignors to Yawata Iron and Steel
Co., Ltd., Tokyo, Japan, a corporation of Japan
Filed Oct. 10, 1963, Ser. No. 316,487
Claims priority, application Japan, July 31, 1958,
33/21,544
4 Claims. (Cl. 266—21)

This invention relates to a method of and an apparatus for automatically controlling the speeds of a sintering pallet, an ore feeder and a cooler to keep always the sintered state of ores optimum.

This application is a continuation-in-part of our application Serial No. 830,777, filed July 31, 1959, now abandoned.

In the conventional method of controlling the speed of a Dwight-Lloyd type sintering machine, the speed control of the sintering machine had to be performed by an operator in reliance of his own observations of the sintered state of ores at the time of overturning the sintered ores or of the temperature and pressure of waste gas in the wind box. Further, any change in an amount of raw material to be sintered resulting from the speed control of the sintering machine had also to be regulated by the operator. Moreover, the sintered state of ores was so variable, depending on the quality of raw material, fuel and moisture that it was difficult to artificially keep the sintered state of ores always optimum. These situations in regulating the sintered state of ores by an operator resulted in lowering not only the quality but also the yield of the sintered ores and further deteriorating the working environment by raising the dust.

The present invention provides a method and an apparatus for carrying out said method, in which the sintered state of ores may be always kept optimum by automatically controlling the speeds of the pallet, ore feeder and cooler at the same time by detecting the temperature and pressure of the waste gas in the wind box, with a view to eliminate the aforesaid defects.

Heretofore, there have been some proposals of mechanically controlling the speed of a sintering machine by detecting the pressure of waste gas only or by detecting the temperature of waste gas only. However, an idea of a combined automatic control of the speed of the sintering machine by means of the detection of both temperature and pressure of the waste gas in the wind box has never been proposed.

The object of the present invention is to provide a method of obtaining the optimum sintered state, in which the optimum sintered state may be achieved by the automatic control of the speeds of the pallet, ore feeder and cooler by detecting both temperature and pressure of the waste gas in any wind box installed near the discharging end of the pallet.

Another object of the present invention is to provide a method of obtaining the optimum sintered state by using the detected value of temperature as a basic value for controlling the speeds of the pallet, ore feeder and cooler and using the detected value of pressure as a supplementary one.

A further object of the present invention is to provide a method of obtaining the optimum sintered state, in which the speeds of the pallet, ore feeder and cooler may be automatically controlled at the same rate in compliance with the deviations of the detected values of temperature and pressure of the waste gas from the optimum ranges set in advance to obtain the optimum sintered state.

A further object of the present invention is to provide an apparatus for carrying out the aforesaid method.

The present invention will now be described with reference to the accompanying drawings, in which:

FIGS. 1A–1D and FIGS. 1A′–1D′ are graphs of respective values of the temperature and pressure of each wind box detected by the apparatus of the present invention;

Figure 2:
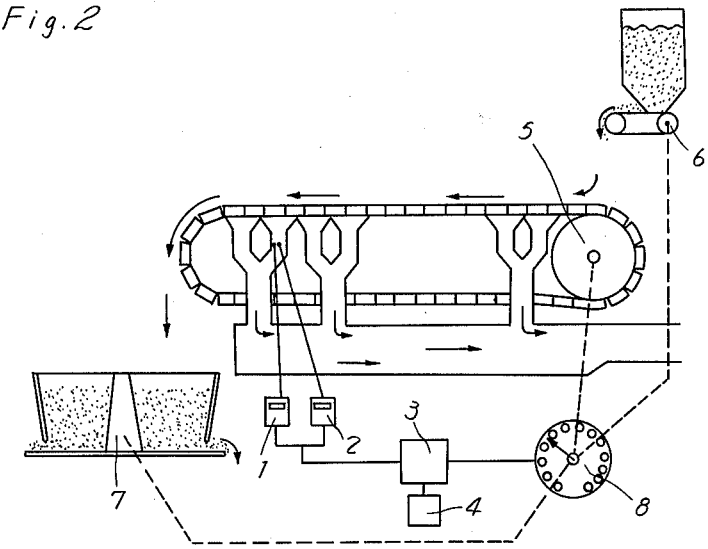
FIG. 2 is a schematic view showing the arrangement of an apparatus embodying the present invention.

In FIGURES 1A–1D and 1A′–1D′ the figures on the abscissa, 12, 13, 14, 15 and 16 indicate the numbers of wind boxes. FIGS. 1A–1D are the curves of temperatures detected in each wind box, while FIGS. 1A′–1D′ are the curves of pressures detected in each wind box. T.H. is the upper limit of the set range of temperature as a commond and T.L. the lower limit thereof. P.H. is the upper limit of the set range of pressure and P.L. the lower limit thereof. That is, the space between T.H. and T.L., as indicated by two dotted lines, shows the set range of temperature and that between P.H. and P.L. the set range of pressure. As seen from this figure, in the embodiments of the method of regulating the speed of a sintering machine according to the present invention the temperature and pressure of the waste gas are detected in the wind box No. 14 in a Dwight-Lloyd type sintering machine which has 16 wind boxes and so automatically regulated that they may be always kept in the set range respectively. FIGS. 1C and 1C′ show the states, in which both temperature and pressure in the wind box No. 14 lie within the set range respectively. In other words, the object of the present invention is to obtain and maintain the temperature and pressure of the waste gas in the wind box No. 14 as shown in FIGS. 1C and 1C′. In FIG. 1B the detected value of temperature in the wind box No. 14 lies above the set range, indicating too early completion of the sintering, though in this case the detected value of pressure lies in the set range as shown in FIG. 1B′. On the contrary, in FIG. 1D the detected value of temperature of the waste gas in the wind box No. 14 is below the set range, showing an unfavorable condition of the sintering, though in FIG. 1D′ the detected value of pressure lies within the set range. These mean that the temperature in a wind box is more precisely responsive to the sintering conditions, whereas the pressure is not so, and consequently this informs that the detected value of temperature should be used as the basis for controlling the speed of sintering machine. In the case of FIG. 1B the speed of the sintering machine is to be accelerated to gain the state of FIG. 1C, whereas in the case of FIG. 1D it should be decelerated to gain the state of FIG. 1C.

The conditions in FIGS. 1A and 1A′ are somewhat different from the above mentioned cases. Both temperature and pressure are below the set range respectively. The detected value of temperature in the wind box No.

14 below the set range as shown in FIG. 1A indicates a signal of decelerating the sintering machine. However, as seen from the curve in FIG. 1A, the actual condition of sintering is quite contrary, because in the wind box No. 13 the detected value of temperature already exceeded the set range, indicating too early completion of sintering which should be corrected by accelerating the sintering machine.

That is to say, the detected value of temperature in the case of FIG. 1A does not correspond to the actual condition of sintering. On the contrary, in FIG. 1A' the detected value of pressure in the wind box No. 14, which is below the set range, instructing a signal of accelerating the speed of the sintering machine, indicates adequately the actual condition of sintering. Therefore, in this case, the signal on the pressure side is to be adopted instead of that on the temperature side. The above conditions demonstrate that the control of the speed of the sintering machine on the basis of detecting the temperature only is dangerous and should be supplemented by detecting the pressure. Summarily, the detected value of temperature renders the basic means for controlling the speed of the sintering machine and the detected value of pressure the supplementary.

In the present invention, the detection of temperature and pressure in a wind box is not limited to the wind box No. 14. It may be carried out in any wind box installed near the discharging end of the pallet.

With reference to FIGURE 2, showing an arrangement of an apparatus embodying the present invention, the temperature and pressure of the waste gas in the wind box are connected to an electronic thermometer 1 and a pressure gauge 2, respectively, to detect them. The sintering machine is automatically controlled, depending on the detected values of temperature and pressure so that the variations of temperature and pressure caused by the fluctuation of the sintered state may be always kept within the range of the optimum sintered state set in advance. If the temperature or pressure comes out of the set range the detected values will be immediately transmitted to the control circuit 3. In said control circuit 3, a motor for driving a field regulator (not shown in the figure) which is to regulate the generator motor (shown as MG), is gradually operated by a timer circuit 4 to move said field regulator. That is, the generator motor regulating field regulator increases or decreases the voltage of the generator. When the voltage of the generator motor is controlled, it changes the voltage in shunt field of a motor of the pallet 5, of a motor of the ore feeder 6 and of a motor of the cooler 7. (These motors are shown as DM.) and therefore the voltages of these motors are increased or decreased. According to the increase or decrease in the voltages of these motors the speeds of the pallet, or feeder and cooler are varied at the same rate so as to keep the detected values of temperature and pressure of the waste gas in the wind box always within the range of the optimum sintered state. Thus, the essential mechanism of controlling the speeds of the pallet, ore feeder and cooler according to the method of the present invention lies in that according to the deviations of the detected values of temperature and pressure of the waste gas from the set values the generator motor regulating field regulator is moved, thereby increasing or decreasing the voltage of the generator, and the speeds of the pallet, ore feeder and cooler are regulated by the change in the generator voltage. In more detail, when the temperature of the waste gas will rise above the set range, or the pressure of the waste gas will fall below the set range, indicating the too early completion of the sintering in both cases, the speed of the sintering machine is accelerated by increasing the generator voltage by gradually rotating the generator motor regulating field regulator in the right direction, and when the temperature of the waste gas will come below the set range or when the pressure of the waste gas will rise above the set range, indicating the unfavorable state of the sintering in both cases, the speed of the sintering machine is decelerated by decreasing the generator voltage by gradually rotating the generator motor regulating field regulator in the reverse direction. It is necessary to control the speeds of the pallet, ore feeder and cooler at the same rate because if the speed ratio of the ore feeder and the pallet changes, the raw material fed on the pallet will be short or in excess, and if the sinter discharged from the pallet into the cooler and that discharged from the cooler are not kept balanced due to the change in the speed ratio of the cooler and the pallet, the sinter in the cooler will be also short or in excess.

Figure 3:
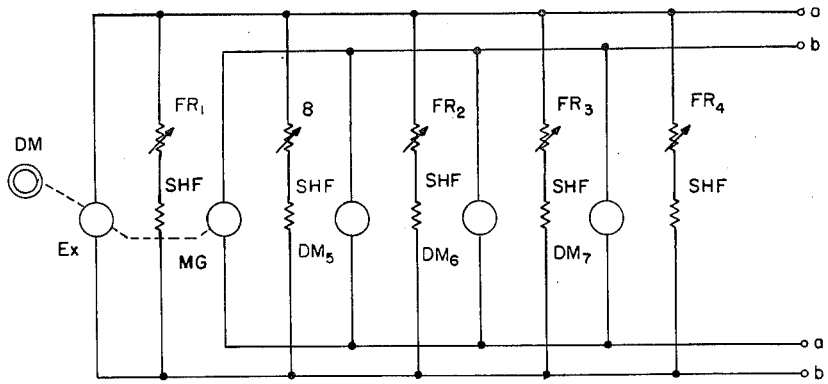
FIG. 3 is a schematic wiring diagram of the generator motor and driving motors of the pallet, ore feeder and cooler.

FIG. 3 shows the system of regulating the motor generator and the motors for driving the pallet, ore feeder and cooler in detail.

In FIG. 3 the sign MG designates the motor generator, the sign E$x$ the exciter and the sign SHF the shunt field. 5 is the pallet, 6 is the ore feeder, 7 is the cooler and 8 shows the motor generator regulating field regulator. The sign DM is a three-phase alternating current motor for driving the exciter and the motor generator, $DM_5$ is the motor for driving the pallet 5, $DM_6$ the motor for driving the ore feeder 6 and $DM_7$ the motor for driving the cooler 7. $FR_1$ designates a regulator of the exciter, $FR_2$ a regulator of the driving motor $DM_5$ of the pallet, $FR_3$ a regulator of the driving motor $DM_6$ of the ore feeder and $FR_4$ a regulator of the driving mtoor $DM_7$ of the cooler. The letter $a$ designates a field bus-line and the letter $b$ an armature bus-line. As seen from this figure, the field regulator 8 regulates the motor generator and increases or decreases the voltage of the motor generator. By the control of the generator voltage the voltage in shunt field of the motor of the driving motor $DM_5$ of the pallet, that of the driving motor $DM_6$ of the ore feeder and that of the driving motor $DM_7$ of the cooler is changed respectively, thereby the speeds of the pallet 5, ore feeder 6 and cooler 7 are varied at the same rate.

Then, the mechanism of regulating the field regulator 8 by means of the detection of the temperature and pressure will be elucidated with reference to FIGS. 4, 5, 6 and 7.

Figure 4:
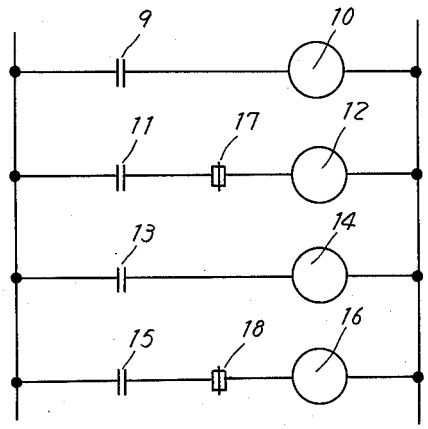
FIGS. 4, 5 and 6 are schematic wiring diagrams of parts of the control means.

With reference to FIG. 4 showing a wiring diagram of part of the control means, the detection of the temperature is transmitted either to an accelerating contact 11 or to a decelerating contact 15, while the detection of the pressure is transmitted to an accelerating contact 9 or to a decelerating contact 13. That is, when the temperature comes above the set range, the accelerating contact 11 is closed and an accelerating relay 12 is excited through an inserted contact 17 on the pressure side. On the contrary, when the temperature falls below the set range, the decelerating contact 15 is closed and a decelerating relay 16 is excited through an inserted contact 18 on the pressure side. Further, when the pressure falls below the set value, indicating such early completion of the sintering as being unable to be corrected by the temperature control, the accelerating contact 9 is closed and the accelerating relay 10 is excited. When the accelerating relay is excited, said contact 17 is opened, thereby putting the accelerating relay 12 for the temperature in the non-excited state. Thus, in this case the accelerating relay 10 for the pressure is excited in place of the accelerating relay 12 for the temperature. On the contrary, when the pressure rises above the set range, indicating such unfavorable sintered state as being unable to be corrected by the temperature control, the decelerating contact 13 is closed and the decelerating relay 14 is excited. When the decelerating relay 14 is excited, said contact 18 is opened, putting the decelerating relay 16 in the non-exciting state. Thus, in this case, the decelerating relay 14 for the pressure is excited in place of the decelerating relay 16 for the temperature.

In the system of regulating the movement of the generator voltage regulating field regulator 8 there are two kinds of circuits: i.e., the field regulator driving motor control circuit and the time control circuit.

Figure 5:
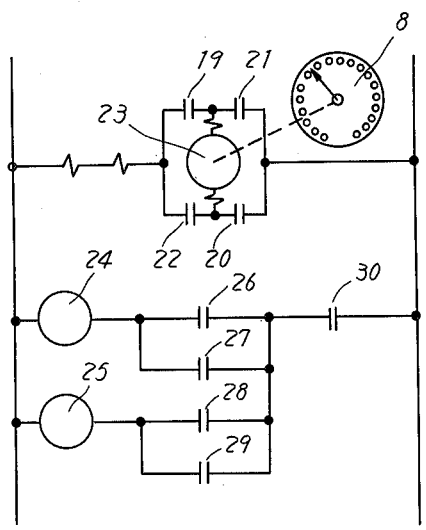

FIG. 5 shows the control circuit diagram for the field regulator driving motor. In the circuit in FIG. 5 there are inserted the accelerating and decelerating contacts for the temperature and the accelerating and decelerating contacts for the pressure; the accelerating contact 26 for the temperature which is to be closed by the exciting of the accelerating relay 12 for the temperature, the decelerating contact 28 for the temperature which is to be closed by the exciting of the decelerating relay 16 for the temperature, and the accelerating contact 27 for the pressure which is to be closed by the exciting of the accelerating relay 10 for the pressure and the decelerating contact 29 for the pressure. which is to be closed by the exciting of the decelerating relay 14 for the pressure.

Figure 6:
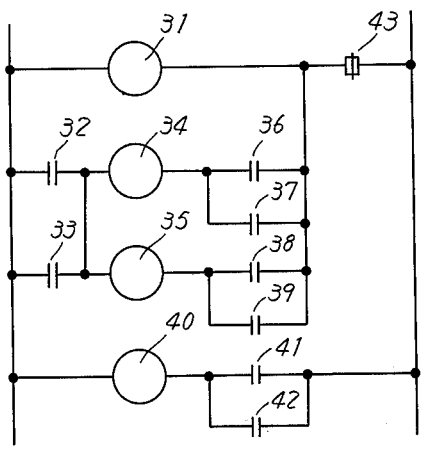

In the circuit in FIG. 6, showing the timer control circuit diagram, there are also inserted the accelerating and decelerating contacts for the temperature and the accelerating and decelerating contacts for the pressure; the accelerating contact 36 for the temperature which is to be closed by the exciting of the accelerating relay 12 and the decelerating contact 37 for the temperature which is to be closed by the exciting of the decelerating relay 16, and the accelerating contact 37 for the pressure, which is to be closed by the exciting of the accelerating relay 10 and the decelerating contact 39 for the pressure which is to be closed by the exciting of the decelerating relay 14.

Figure 7:
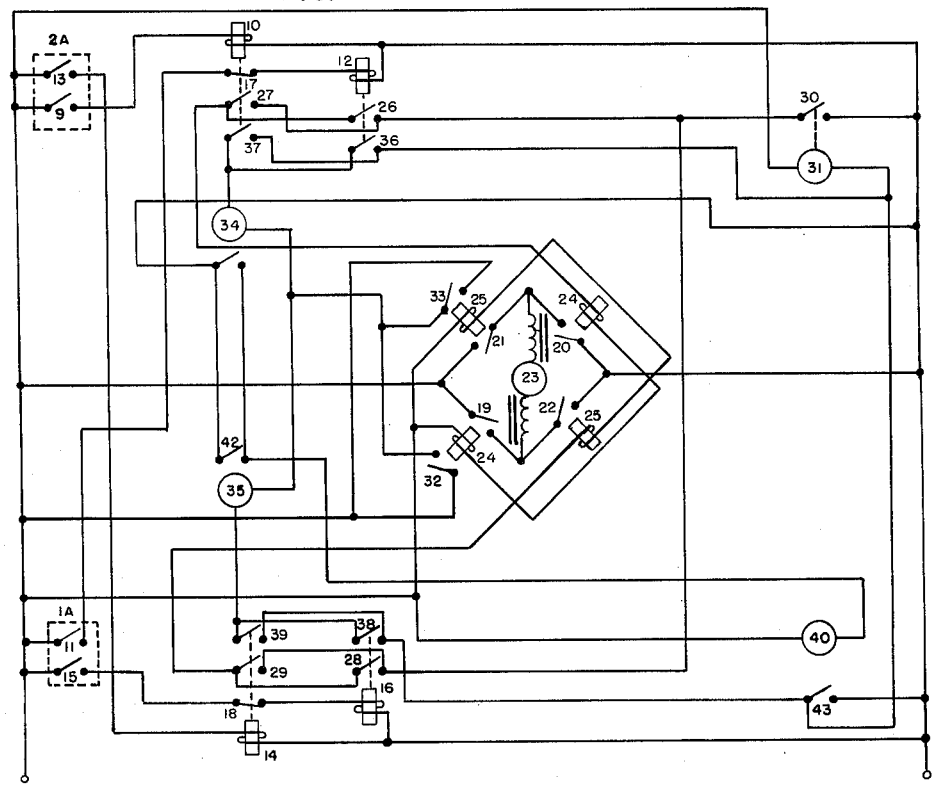
FIG. 7 is a block wiring diagram of the control means according to the present invention.

With reference to FIG. 7 showing a block wiring diagram of the control means the mechanism of controlling the regulator driving motor 23 will be summarily explained.

In the case of accelerating the sintering machine, in the field regulator driving motor control circuit either the accelerating contact 26 for the temperature or the accelerating contact 27 for the pressure is closed, thereby the accelerating regulators 24 are excited through the timer contact 30 which is being closed by the timer 31 in the timer circuit. By the exciting of the accelerating contacts 24 the accelerating contacts 19 and 20 in the regulator driving motor control circuit are closed, thereby the regulator driving motor 23 begins to rotate gradually in the right direction. The rotation of the regulator driving motor 23 in the right direction causes the field regulator 8 to move in the right direction to elevate the generator voltage, thereby the acceleration of the sintering machine may be accomplished.

Next, in the timer control circuit the accelerating contact 36 for the temperature is closed by the exciting of the accelerating relay 12, and then the timer 34 on the temperature side begins to operate with the closure of the contact 32 of the accelerating regulator 24. After the lapse of a set time (which may be regulated to be 0 to 10 seconds depending on the sintered state and is normally set to be 1.5 to 2 times as long as the time for the timer on the temperature side) has passed, the contact 42 of the timer 35 is closed. When the contact 41 or 42 is closed, the switching relay 40 is excited and the switching relay 43 is opened, thereby the timer 31, the timer 34 and the timer 35 are put in the non-exciting state. When the timer 31 is not excited, the contact 30 is opened, thereby the accelerating regulator 24 is put in the non-exciting state. Consequently, the contacts 19 and 20 are opened, resulting in the stop of the right rotation of the field regulator 8. Accordingly, the movement of the field regulator 8 is also stopped. On the contrary, when the timer 34 or the timer 35 is no longer excited, the contact 41 is opened in the case of the temperature and the contact 42 is opened in the case of the pressure, thereby the switching relay 40 is put in the non-exciting state and consequently the switching contact is again closed. Then the timer 31 begins again to operate. After a set time (which may be regulated depending on the sintered state) has passed, the contact 30 is closed. Then the control operation will be repeated in the manner as above mentioned, but provided that the accelerating contact 26 for the temperature of the accelerating contact 27 for the pressure still remains in the closed state.

In the case of decelerating the speeds of the sintering machine, in the field regulator driving motor control circuit, either the decelerating contact 2 for the temperature or the decelerating contact 29 for the pressure is closed, thereby the decelerating regulators 25 are excited through the contact 30 which is being closed by the timer 31 in the timer control circuit. Then, the decelerating contacts 21 and 22 in the regulator driving motor control circuit are closed, thereby the regulator driving motor 23 begins to rotate in the reverse direction. The rotation of the regulator driving motor 23 in the reverse direction causes the field regulator 8 to move gradually in the reverse direction to lower the generator voltage, thereby the deceleration of the sintering machine may be achieved.

In the timer control circuit, when the decelerating contact 37 for the temperature is closed by the exciting of the decelerating relay 16, the timer 34 on the temperature side begins to operate with the closure of the contact 33 of the decelerating regulator 25. After the lapse of a set time (which may be regulated to be 0 to 5 seconds depending on the sintered state), the contact 41 of the timer 34 is closed. Further, when the decelerating contact 39 for the pressure is closed by the exciting of the decelerating relay 14, the timer 35 on the pressure side begins to operate with the closure of the contact 33 of the decelerating regulator 25. When a set time (which may be regulated to be 0 to 10 seconds and normally set to be 1.5 to 2 times as long as the time for the timer on the temperature side) has passed, the contact 42 of the timer 35 on the pressure side is closed. The subsequent switching control is the same as in the case of accelerating the sintering machine.

Thus, by gradually moving the generator voltage regulating field regulator 8 to gradually vary the generator voltage according to the instructions dispatched from 1A and 2A as shown in FIG. 7, in which 1A indicates the upper (11) and lower (15) limits of the deviations in the temperature detected by the thermometer and 2A the upper (9) and lower (13) limits of the deviations in the pressure detected by the pressure gauge, the speeds of the pallet, ore feeder and cooler are changed at the same time so as to keep the sintered state in the optimum set range.

*Example*

An experiment of controlling the speeds of the sintering pallet, ore feeder and cooler was carried out with the sintering machine with a capacity of 1,000 t./day (maximum 1,500 t./day). The pallet was 29 m. in an effective length, 1.83 m. in an effective width and 53 m.² in an effective area. The airflow to be sucked amounted to 3,900 m.³/min. and was of a pressure of −1,200 mm. Ag at 120° C. The sintering machine had 16 wind boxes and the detection of the temperature and pressure of the waste gas was carried out in the wind box No. 14. The optimum range of the temperature of the waste gas was set to be 330 to 350° C. and that of the pressure to −1,100 to −1,150 mm. Ag (as a matter or of course, these set values are not absolute. They may be varied depending on the changes in the raw material condition).

Under the above set values the speed of the pallet automatically controlled was 1.8 m./min. in a monthly average and the change in the speed thereof was 0.5 m./min. in a monthly average. The speed of the ore feeder was 600 r.p.m. in a monthly average and the change in the speed thereof was 50 r.p.m. in a monthly average, when the amount of the raw material fed averaged monthly 150/hour. The speed of the cooler was 0.8 m./min. in a monthly average and the change in the speed thereof was 0.2 m./min.

The sinter produced under the aforesaid control conditions amounted to 1.400 t./day in a monthly average, the strength of the product was 83% in a monthly average according to the Shutter index (+10 mm.) and the yield of the product showed 63.3% in a monthly average. When the sinter was used in the blast furnace up to 67% of the charge, the coke ratio of 530 kg. per ton pig iron was recorded.

Figure 8:
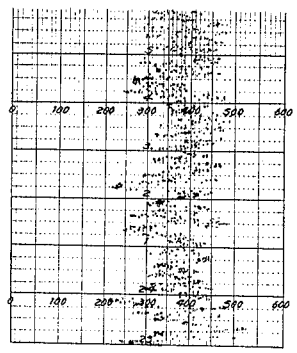
FIG. 8 shows a waste gas temperature diagram before the present automatic control apparatus was used on a sintering machine.
Figure 10:
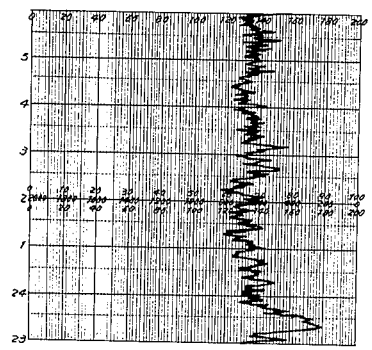
FIG. 10 shows a waste gas pressure diagram before the present automatic control apparatus was used.
Figure 9:
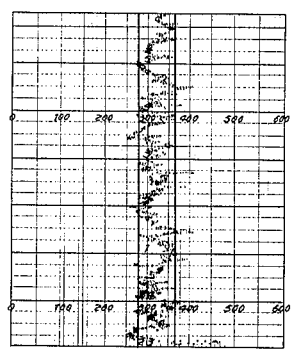
FIG. 9 shows a waste gas temperature diagram after the present automatic control apparatus was used.
Figure 11:
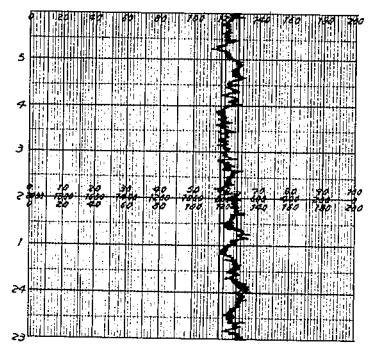
FIG. 11 shows a waste gas pressure diagram after the present automatic control apparatus was used.

FIGS. 8, 9, 10 and 11 demonstrate the merits of the present invention by comparing the states of the temperature and pressure of the waste gas before and after the apparatus of the present invention was used on a sintering machine. Before the apparatus of the present invention was used the striking irregular fluctuations are shown in both temperature and pressure as shown in FIGS. 8 and 10, while after the apparatus was used the fluctuations in the temperature and pressure have been limited substantially within the set ranges as shown in FIGS. 9 and 11. Thus, by applying the apparatus of the present invention to a sintering machine various advantages such as uniform and high quality of the sinter, increase in the yield and product amount, reduction in coke ratio when the sinter produced by the present invention is used in a blast furnace and improvement of the working environment may be obtained.

The application of the present invention is not limited to the Dwight-Lloyd sintering machine, but also to any belt-type baking furnace.

What we claim is:

1. A control means for a Dwight-Lloyd type of sintering machine having a motor driven ore feeder, motor driven cooling means and motor driven pallet means, and a wind box near the discharge end of the pallet through which gases drawn through the material on the pallet are drawn during the sintering operation, said control means comprising a speed control for the motors for driving the ore feeder, the cooling means and the pallet, electronic temperature sensing means and electronic pressure detecing means in said wind box for sensing the temperature and pressure of the gases passing through the wind box, and control circuit means coupled between said temperature and pressure sensing means and said speed control and having means for energizing said speed control to increase the speed of said motors when either of said temperature and pressure sensing means senses a temperature condition above the predetermined upper limit or a pressure condition below a predetermined lower limit, and further having means for energizing said speed control to decrease the speed of said motors when either of said temperature and pressure sensing means senses a temperature condition below a predetermined limit or a pressure condition above a predetermined limit, and further having means for disconnecting said temperature sensing means from said energizing means when said pressure sensing means senses a pressure outside of said predetermined limits.

2. A control means as claimed in claim 1 in which said energizing means for increasing the speed of the motors comprise a first relay means for moving said speed control to increase the speed of the motors, and said energizing means for decreasing the speed of the motors comprises a second relay means for moving said speed control to decrease the speed of the motors, and said control circuit means includes timer means connected to said relay means for periodically connecting said relay means to said speed control for limiting the duration of time during which said relay means acts on said speed control.

3. A control means as claimed in claim 2 in which said first relay means comprises a temperature increase responsive relay responsive to an increase in temperature above the predetermined upper limit and measured by said temperature sensing means and a pressure decrease responsive relay responsive to a drop in pressure below the predetermined lower limit and measured by said pressure sensing means, said disconnecting means comprising a cut-out switch connected in the circuit of said temperature increase responsive relay and opened by actuation of said pressure decrease responsive relay, and said second relay means comprising a temperature decrease responsive relay responsive to a decrease in temperature below the predetermined lower limit and measured by the temperature sensing means, and a pressure increase responsive relay responsive to an increase in pressure above the predetermined upper limit and measured by said pressure sensing means, and disconnecting means further comprising a cut-out switch connected in the circuit of said temperature decrease responsive relay and opened by actuation of the pressure increase responsive relay.

4. A method of controlling a Dwight-Lloyd type sintering machine, comprising the steps of sensing the temperature and pressure of the gas flowing in a wind box at the outlet end of the sintering machine, and with the pressure within predetermined limits, when the temperature is above a predetermined upper limit, increasing the speed of the pallet, the ore feed means and the cooling means, when the temperature is below the predetermined lower limit, decreasing the speed of the pallet, ore feed means and the cooling means, and when the pressure is above the predetermined upper limit, regardless of the temperature, decreasing the speed of the pallet, ore feed means and the cooling means, and when the pressure is below the predetermined lower limit, increasing the speed of the pallet, ore feed means and the cooling means.

References Cited by the Examiner

UNITED STATES PATENTS

| 2,212,005 | 8/40 | Bressler | 236—15 XR |
| 2,410,944 | 11/46 | Johnson | 266—21 |
| 2,862,308 | 12/58 | Meredith et al. | 266—21 XR |
| 2,878,003 | 3/59 | Dykeman et al. | 266—21 XR |
| 3,050,299 | 8/62 | Reed | 266—25 XR |

WHITMORE A. WILTZ, *Primary Examiner.*

JAMES H. TAYMAN, JR., *Examiner.*